Aug. 21, 1962 R. D. RUMSEY 3,049,941
VIBRATION DAMPER STRUCTURE
Filed April 28, 1961
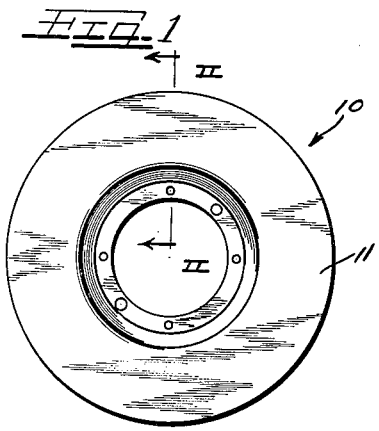
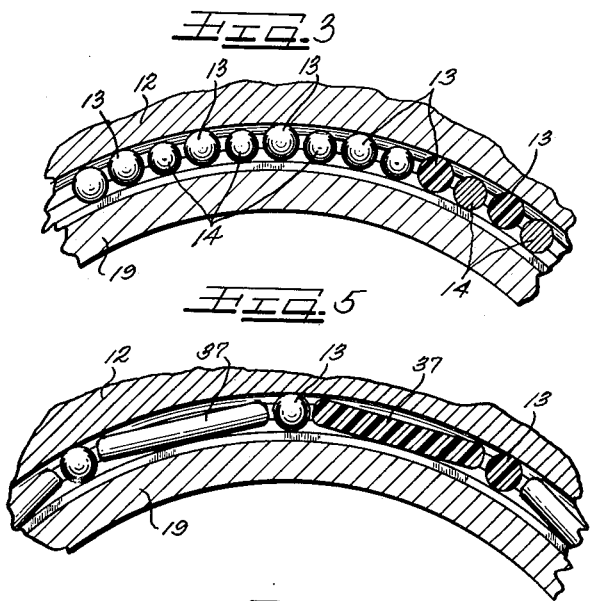
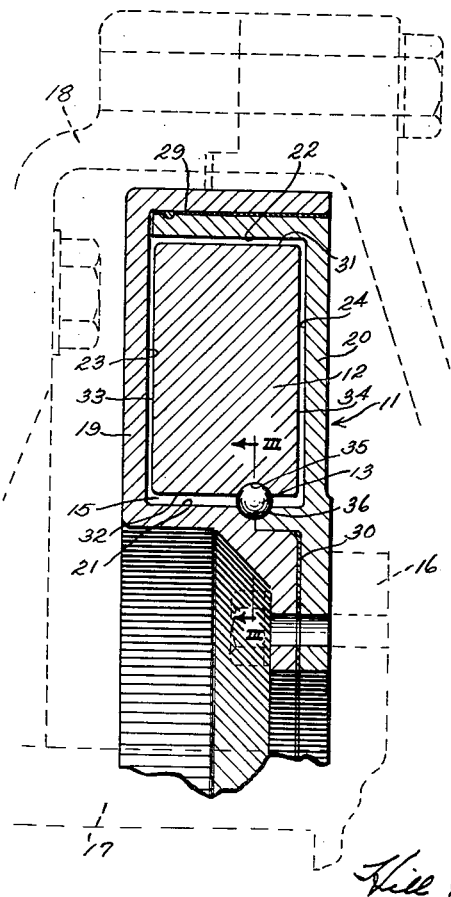
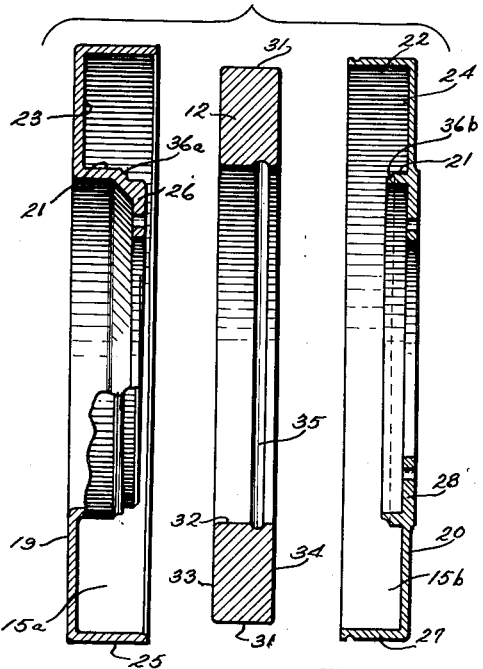
INVENTOR.
ROLLIN DOUGLAS RUMSEY
BY
ATTORNEYS

United States Patent Office 3,049,941
Patented Aug. 21, 1962

3,049,941
VIBRATION DAMPER STRUCTURE
Rollin Douglas Rumsey, Buffalo, N.Y., assignor to Houdaille Industries, Inc., Buffalo, N.Y., a corporation of Michigan
Filed Apr. 28, 1961, Ser. No. 106,221
6 Claims. (Cl. 74—574)

This invention relates generally to vibration damper structure, and more specifically to an improved structure for supporting an inertia member therein.

Although the principles of the present invention may be included in various damper structures, a particularly useful application is made in a viscous vibration damper structure adapted to be secured to a rotating shaft, such as the crank shaft of an automotive internal combustion engine or small-size diesel engine. In particular, when a manufacturer enters a volume market such as an automotive engines, it is particularly desirable that maximum damping be attained at the lowest possible cost and weight per damper unit.

Certain prior structures have incorporated an inertia member which is engageable with the housing within which it is disposed, thereby being susceptible to galling or other binding with respect to such housing. Such susceptibility to galling is referred to in the trade as "incompatibility" and the incompatibility problem has previously been solved by appropriate treatment or plating of engaging surfaces. However, such treatment or plating adds to the cost of the resulting article.

The present invention contemplates the utilization of appropriately constructed bearing means to support the inertia member within the housing in a manner to preclude engagement between the inertia member and the housing, thereby solving the incompatibility problem by precluding any engagement between the inertia member and the housing. In the preferred form of my invention, a series of nylon balls are employed as the bearing means, such balls being spaced by non-load-bearing elements to minimize the number of nylon balls required.

Accordingly, it is an object of the present invention to provide an improved vibration damper structure.

Another object of the present invention is to provide means for supporting an inertia member in a housing in a manner which solves the incompatibility problem.

Yet another object of the present invention is to provide a low-cost vibration damper which is extremely reliable and not susceptible to malfunction over long periods of use.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a small scale outer side elevational view of a viscous torsional vibration damper constructed in accordance with the principles of the present invention;

FIGURE 2 is an enlarged sectional detail view taken substantially on line II—II of FIGURE 1;

FIGURE 3 is an enlarged fragmentary sectional view taken substantially on the line III—III of FIGURE 2;

FIGURE 4 is an exploded sectional detail view of certain damper unit components; and FIGURE 5 is a view corresponding to FIGURE 3, showing an alternate spacer means.

As shown on the drawings:

The principles of this invention are particularly useful when embodied in a viscous torsional vibration damper assembly such as illustrated in FIGURE 1, generally indicated by the numeral 10. The damper assembly includes a housing 11, an inertia member or inertia mass means 12, separate bearing means or series of bearings 13, and non-load-bearing spacer means 14. The housing 11 has a chamber 15 within which the inertia member 12 is disposed, and within which there is also provided means yieldably coupling the inertia member 12 to the housing 11, for example a viscous damping fluid.

The housing 11 is of generally ring or annular form adapting it especially for attachment to a suitable flange 16 of a shaft 17 of a device such as an engine, there being a suitable housing 18 within which the damper unit 10 freely rotates with the shaft 17.

The housing 11 includes a pair of complementary housing or casing sections 19, 20, having axially opening recesses which jointly define the chamber 15 therebetween. Thus the chamber 15 has a circular cross-section which, in this embodiment, is annular. The means which defines the chamber 15 has an inner circumferential surface 21, an outer circumferential surface 22, and axially directed surfaces 23 and 24. The surfaces 21–24 jointly comprise a surface of revolution, also referred to herein as a first working surface.

In a satisfactory construction, the two housing sections 19, 20 are made from a lightweight material such as aluminum, zinc, or magnesium in suitable alloy to enable die casting or plaster casting to such accuracy as to require little or no machining, especially as to said first working surface. Accordingly, the housing section 19 comprises a recess and flange section provided with an annular recess 15a opening toward one axial side of the section 19 as shown in FIGURE 4. The recess 15a is defined by an outer peripheral flange portion 25 and an inner peripheral hub flange portion 26. The diameters of the flange portions 25, 26 inside the recess 15a are properly dimensioned relative to the corresponding opposing diameters of the inertia member 12 to afford the desired shear film space relationship.

The housing section 20 closingly coacts wtih the housing section 19, and provides a complementary recess 15b, an outer peripheral flange 27, and an inner peripheral flange and hub portion 28. The outer flange 27 extends axially and is slidingly received by the flange 25 in a rather close fit. The inner hub portion 28 overlaps and abuts the inner hub portion 26 with a close fit. Thus the outer peripheral flanges 25 and 27 comprise mutually engaging surfaces, and the axially and radially extending surfaces 26, 28 also comprise mutually engaging surfaces.

In order to provide a leak-proof joint between the housing sections 19 and 20, all mutually engaging surfaces of the sections are provided with permanent cementing and sealing material, exemplified in FIGURE 2 at 29 and 30. Satisfactory results have been experienced where the cementing material has been a polyester or epoxy resin, characterized by chemical inertness and high heat resistance. There is some preference for the epoxy type cement-sealer because of the good adhesion and the very low shrinkage on curing. These cements are thermosetting and will resist deterioration at the temperatures to which a damper of the present kind may be subjected in use on an internal combustion engine shaft. The overlapping surfaces of the flanges 25 and 27 as well as 26 and 28 are coated with the resin cement, and these parts, together with the inertia means 12, bearings 13, and spacers 14, in assembled relation, are then subjected to curing heat. For example, the epoxy resin adhesive compound is cured by subjecting the assembly to a temperature of 350° F. for about two hours. The joint thus constructed forms a permanent fluid seal, the fluid being added later through an appropriate opening closed by an appropriate filler plug (not shown).

The inertia member 12 preferably has a high moment of inertia, and thus a heavy material may be selected from which the same is fabricated, for example, cast iron, sintered powdered iron, or die cast zinc, the latter being advantageous since machining thereof is eliminated, except for a surface 35 described below. In this embodiment, the inertia member 12 has a circular cross-section defined by its outer diameter, and in particular, has an annular cross-section. The member includes an outer circumference 31, an inner circumference or periphery 32, and axially directed surfaces 33, 34. The surfaces 31–34 jointly comprise a surface of revolution which is also referred to herein as a second working surface. It will be noted that the surfaces 31–34 is parallel to the surfaces 21–24, and that the working surfaces are in shear film spaced relation, the spacing being exaggerated in FIGURE 2 for purposes of illustration.

The inertia member 12 is provided with a first recessed bearing track 35 on its inner circumference 32, and the housing 11 is provided with a second recessed bearing track 36 on its inner circumference 21. The bearing track 36 is defined jointly by bearing track portions 36a and 36b respectively carried on the housing sections 19 and 20. The recessed bearing track 36 is thus intersected by one of the mutulaly engaging surfaces of each of the sections 19, 20.

The separate bearing means 13 in this embodiment are thus supported at a circumference of the inertia member 12 at a circumference of the chamber 15, such circumference being the inner circumference thereof.

In a preferred embodiment of this invention, the bearing means 13 comprise ball bearings, disposed in a single row, in engagement with the tracks 35 and 36. It is further preferred that the bearing means 13 comprise nylon balls, preferably sized to the same radius as the tracks 35 and 36. The nylon balls 13 support the inertia member 12, and yet permit its rotation within the annular chamber 15. Since the balls 13 are sized the same as the tracks 35 and 36, the balls 13 also restrict the inertia member 12 against both axial and radial movement, leaving angular movement as its sole freedom of motion. As shown in the drawing, the inertia member is thus maintained by the bearings 13 in concentric relation to the chamber 15. Thus the shear film spacing between the working surfaces 21–24 and 31–34 is also maintained.

It is possible to provide the balls 13 of steel, and thereby reduce the cost. I have found that such structure has thus certain advantages, but such structure has the disadvantage that with use, steel balls cause brinelling of the tracks, thereby creating a clearance, and thereby causing the inertia member 12 to lose its balance with respect to the housing. Balls of other plastic materials, such as epoxy or polyester resin, can be used to advantage, the latter being quite high-temperature resistant.

I have found that a continuous row of plastic balls is unnecessary, and therefore it is economically advantageous to use a mixture of nylon or other plastic and steel balls, such being illustrated in FIGURE 3. Nylon balls typically have a present cost of two to three cents each, whereas steel balls typically have a cost of about one-tenth cent each. I have therefore used a mixture of nylon and steel balls where the steel balls are a size smaller than the nylon balls. Such mixture, as shown in FIGURE 3, includes sufficient nylon or other plastic balls to provide adequate support of the non-brinelling type, the steel balls thus being used merely as spacers to distribute the plastic balls. The steel balls may be .010 inch or more smaller than the plastic balls and are thus not relied upon for support per se.

Since the purpose of the steel balls 14 is merely to serve as spacers, it is apparent that other spacers may be utilized, the same being illustrated in FIGURE 5 by the plastic non-load-bearing spacer means 37, which may comprise increments of nylon rod. Thus a spacer or spacers of selected length may be used between adjacent nylon balls 13 to reduce the number thereof required.

The means yieldably coupling the inertia member 12 to the housing 11 in this embodiment comprises a viscous damping fluid, such as a silicone fluid of 100,000 centistokes at 77° F. This fluid creates a shear film between the spaced working surfaces and engages and couples the housing sections with the inertia member.

In an actual construction, the nylon balls 13 could typically be standard size elements, such as of one-fourth or three-eighths inch diameter. Such are commercially available with a .004 inch total tolerance as molded, or with a .002 inch total tolerance if ground. There is a slight flash on the molded balls and therefore the ground balls are preferred. Since the tracks 35 and 36 are machined to the same radius as the nylon balls 13, there is provided a maximum support and a minimum distortion force on the balls 13. The tracks 35 and 36 are normally so machined as to create a fit which is within the range of .004 inch clearance to .002 inch interference. If extreme balance control is required, no more than .002 inch clearance should be permitted.

Since the housing sections 19 and 20 are die cast, and since certain tolerances are required for die casting, and since it is desired to do no machining of the surfaces defining the chamber 15, it is necessary to allow a radial clearance variation between the housing walls and the inertia member 12 of approximately .010 to .036 inch for a ten-inch damper unit, and an axial gap of approximately .008 to .020 inch between each side of the inertia member 12 and the housing section. These clearances are somewhat larger than has been used heretofore, and hence use of fluid having at least 100,000 centistokes viscosity is recommended, but 30,000 centistokes will suffice.

It is to be noted that no plating or sealing of working surfaces is thus necessary, and thereby a cost reduction is achieved. The disclosed damper structure is therefore particularly advantageous for low cost devices.

In operation, as the damper 10 rotates with the associated shaft 17, the shear film spaces between the working surfaces of the housing 11 and inertia member 12 afford substantially uniform thin films of the viscous damping fluid, and the inertia member 12 is compelled to travel corotatably with the damper housing 11 and thus with the rotating shaft 17.

This coupling phenomenon is known, but for convenience it is pointed out that the viscous fluid is present between the opposing parallel working surfaces in films which are thicker than a mere lubricating film but which are of less thickness than a layer which will produce only a fluid drag relationship. A shear film of viscous fluid is the result of an essentially linear velocity gradient spacing between the opposing parallel working surfaces with relation to the viscosity of the damping fluid rather than a non-linear velocity gradient relationship. As the shaft 17 tends to oscillate or vibrate in operation, the same characteristics of the viscous fluid which compel rotation of the inertia member with the housing of the damper also resist relative torsional oscillatory or vibrational movements of the inertia member and the housing and thus of the shaft superimposed upon the normal rotation of the shaft. The force necessary to shear the viscous film between the working surfaces is proportional to the relative angular velocity between the inertia member and the housing. The optimum proportion of the resistance of the viscous shear film to the moment of inertia of the inertia member in each instance is easily calculated for any specific installation. The damping efficiency of this device in proportion to its size enables the unit to be made in relatively small size in proportion to the work load.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A viscous torsional vibration damper, comprising in combination: a pair of complementary housing sections of generally ring form having opposed annular axially opening complementary chamber recesses, said sections each having axially directed outer peripheral telescopically connected flanges and hub portions overlappingly related and secured together; inertia mass means housed within said chamber recesses; a series of bearings each engaging both of said housing sections and said inertia mass means, and jointly operative to support said inertia mass means in spaced relation to said housing sections and viscous damping fluid in said recesses in engagement with said housing sections and said inertia mass means.

2. A torsional vibration damper, comprising in combination: a pair of housing sections jointly having means defining a chamber of annular cross section; an independent inertia member disposed in said chamber, said inertia member having an annular cross section; means yieldably coupling said inertia member to said housing sections; and a single row of separate bearing means, each acting between a circumference of said inertia member and a circumference on each of said housing sections, and operative to rotatably support said inertia member both axially and radially in substantially concentric relation within said chamber.

3. A torsional vibration damper, comprising in combination: a housing including a pair of complementary housing sections jointly defining an annular chamber, said sections being joined together at mutually engaging surfaces; an independent annular inertia member disposed in said chamber; means yieldably coupling said inertia member to said housing; said inertia member having a first recessed bearing track on its inner circumference, and said housing having a second recessed bearing track on the inner circumference of said chamber, said mutually engaging surfaces including surfaces which intersect second bearing track; and a series of bearings each engaging said tracks and supporting said inertia member in spaced relation to said housing sections.

4. A torsional vibration damper, comprising in comprising in combination: a housing having means defining a chamber of circular cross section; an independent inertia member disposed in said chamber, said inertia member having a circular cross section; means yieldably coupling said inertia member to said housing; and a row of plastic ball bearings, acting between said inertia member and said housing, operative to rotatably support said inertia member in substantially concentric relation within said chamber.

5. A torsional vibration damper, comprising in combination: a housing having means defining a chamber of circular cross section; an independent inertia member disposed in said chamber, said inertia member having a circular cross section; means yieldably coupling said inertia member to said housing; a row of plastic ball bearings; and steel ball bearings of smaller size disposed between adjacent ones of said plastic ball bearings; said plastic ball bearings acting between said inertia member and said housing, and being operative to rotatably support said inertia member in substantially concentric relation within said chamber.

6. A viscous torsional vibration damper, comprising in combination: a housing including a pair of complementary housing sections jointly defining an annular chamber, said sections being joined together at mutually engaging surfaces; an independent annular inertia member disposed in said chamber; said housing providing a first working surface and said inertia member having a second working surface parallel to said first working surface and in operative shear film spaced relation thereto; said inertia member having a first recessed bearing track on its inner circumference, and said housing having a second recessed bearing track on the inner circumference of said chamber, said mutually engaging surfaces including surfaces which intersect said second bearing track; a single row of nylon ball bearings engaging said tracks and rotatably supporting said inertia member in fixed spaced relation to said housing sections in substantially concentric relation within said chamber and thereby maintaining the shear film spacing; steel ball bearings of smaller size disposed between adjacent ones of said nylon ball bearings; and viscous damping fluid in said chamber affording a shear film between said spaced working surfaces.

References Cited in the file of this patent

UNITED STATES PATENTS

| | | |
|---|---|---|
| 2,013,109 | Reynolds | Sept. 3, 1935 |
| 2,100,751 | Runge | Nov. 20, 1937 |
| 2,113,390 | Zimmerman | Apr. 5, 1938 |